April 1, 1947.   P. R. HORNBROOK   2,418,302
CONVEYING APPARATUS
Filed June 2, 1944   2 Sheets-Sheet 1
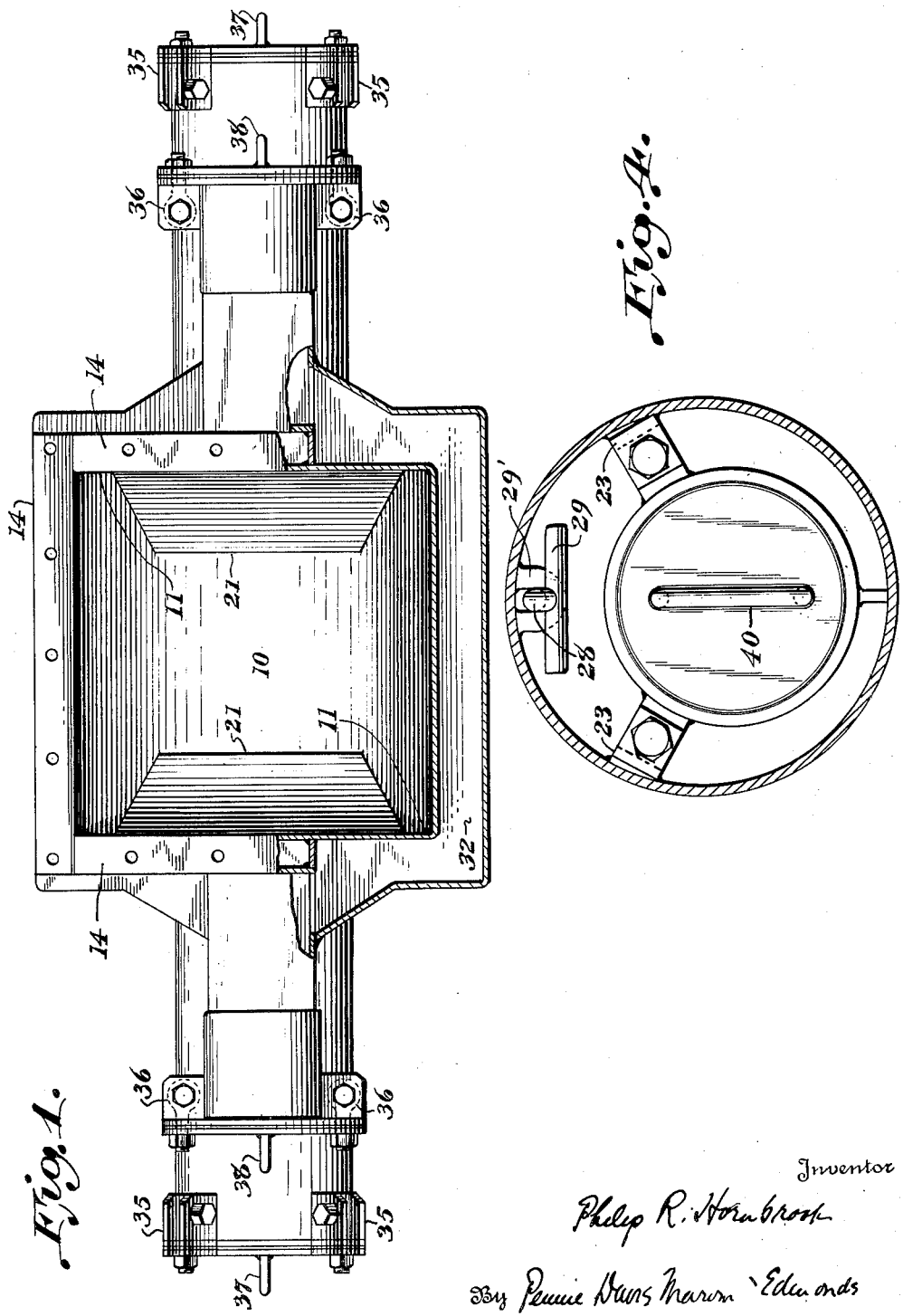

April 1, 1947. P. R. HORNBROOK 2,418,302
CONVEYING APPARATUS
Filed June 2, 1944 2 Sheets-Sheet 2
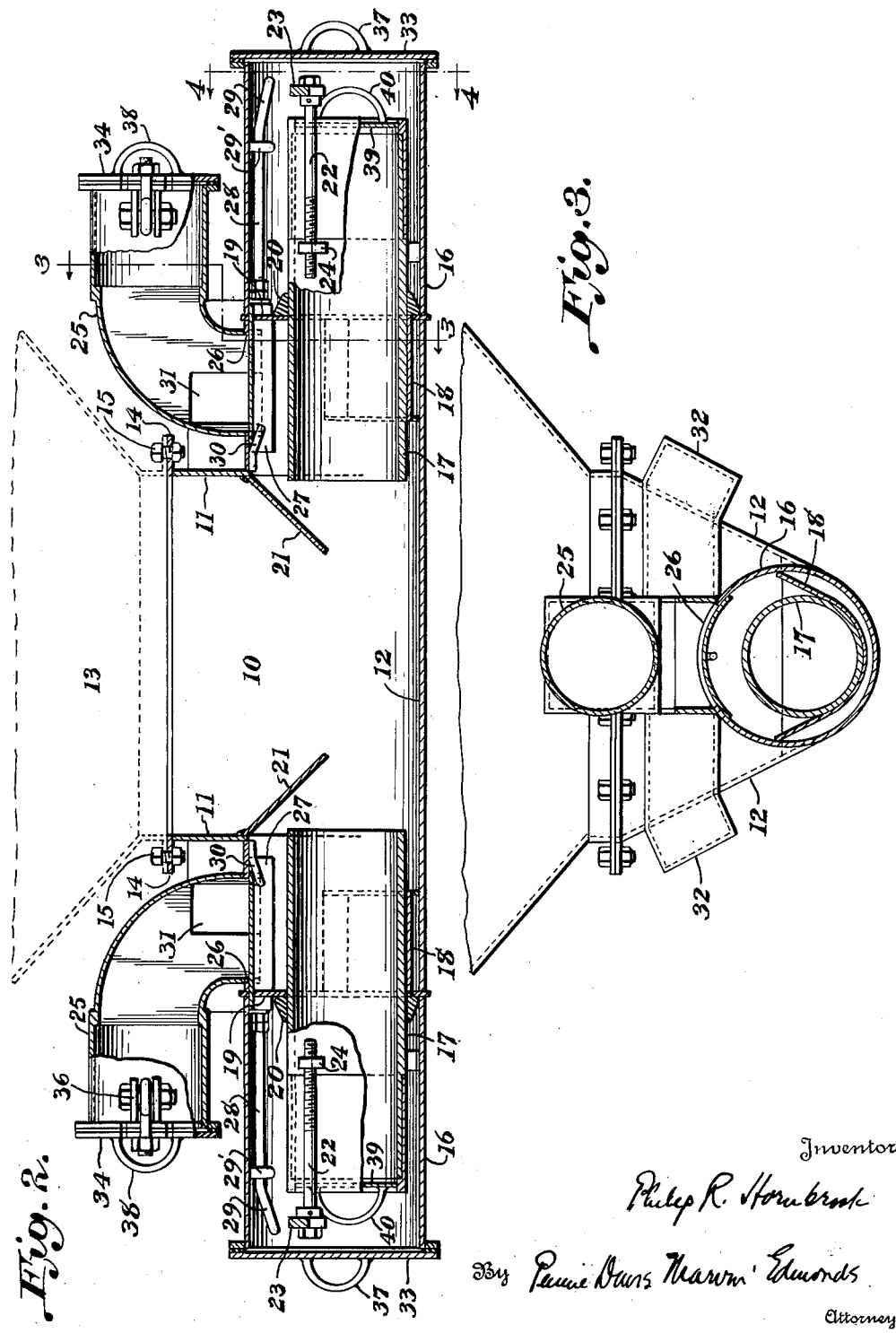
Inventor
Philip R. Hornbrook
By Pennie Davis Marvin Edmonds
Attorneys Patented Apr. 1, 1947

2,418,302

UNITED STATES PATENT OFFICE 2,418,302

CONVEYING APPARATUS

Philip R. Hornbrook, Allentown, Pa., assignor to Fuller Company, Catasauqua, Pa., a corporation of Delaware Application June 2, 1944, Serial No. 538,437

8 Claims. (Cl. 302—52)

This invention relates to apparatus for unloading railroad cars and similar receptacles of the hopper bottom type, and more particularly the invention is concerned with a novel unloader adapted to be connected to a pneumatic system for unloading such receptacles. The new unloader is primarily intended for use in unloading fine, pulverulent, or ground material which is capable of being entrained in an air stream and delivered through a conduit to a desired point.

Pneumatic conveying systems are widely used at present for transporting fine, pulverulent or crushed material which is capable of being entrained in an air stream. The transporting of material in this manner may be used to deliver the material to a desired point adjacent the receptacle or at a point remote therefrom.

Such pneumatic systems usually comprise a receiver in which is maintained a reduced pressure by suitable means, a conduit connected to the receiver at one end and connected at its other end to a nozzle adapted to be inserted in the material to be conveyed. Air admitted adjacent the nozzle end entrains the material and causes a flow of air and material to the receiver as a result of the reduced pressure maintained therein.

Apparatus of the type described when used for unloading receptacles of the hopper bottom type, especially hopper bottom cars where the nozzle is attached below the well of the hopper, has heretofore proved to have certain disadvantages. For example, when certain materials are transported or stored for considerable time they lose their free-flowing characteristics, and as the system operates the material adjacent the nozzle is removed, leaving a cavity adjacent the nozzle whereby the entraining air, in its travel into the nozzle, fails to loosen the material and transport it through the system to the discharge point. Similar disadvantages arise when the receptacle is nearly completely empty. In this case, material in the receptacle of the unloader adjacent the discharge nozzle is entrained, but as the receptacle must of necessity be of considerable size, a substantial amount of material is left. Certain materials, such as flour, are subject to deterioration and if left only in small quantities may completely contaminate the next shipment, unless expensive cleaning operations are performed prior to each shipment.

Heretofore, attempts have been made to ship various chemicals, flour, cereals, etc., normally shipped in package form, in hopper bottom cars in order to eliminate the expense of packaging and handling. However, contamination of these materials by the entraining air drawn from the surrounding atmosphere with conveying apparatus heretofore known, has precluded use of such inexpensive unloading and storing means.

The present invention is, accordingly, directed to the provision of apparatus for pneumatically conveying pulverulent, granular and crushed material, in which the material from a container is received by the apparatus and caused to flow through a conduit by a differential of pressure. The new apparatus including novel means to receive and control the entraining gas in a manner to insure against contamination of the material to be conveyed, to obtain maximum discharge rate, and complete discharge of the material in the container.

The apparatus of the invention comprises a body member so formed as to be permanently or detachably secured to the lowermost portion of a hopper bottom receptacle. The body includes side walls, and a bottom defining a receptacle. Tubular outlets communicate with the receptacle at diametrically opposite sides and are adapted to house adjustable nozzles through which the material is drawn in conveying. Conduits at each side of the receptacle are provided for directing entraining gas to the tubular outlets, the entrance of the gas from the conduit to the outlet being controlled. Communication between the opposite conduits permits flexibility in the direction of flow of the entraining gas. Caps for the outlets and conduits preclude the entrance of moisture or dirt during storage or transportation.

For a fuller understanding of the nature of the objects of the invention, reference should be had to the following detailed description taken in connection with the accompanying drawings, in which Fig. 1 is a plan view of the device with sections broken away for the purposes of illustration.

Fig. 2 is a vertical sectional view of the device.

Fig. 3 is a sectional view taken on lines 3—3 of Fig. 2.

Fig. 4 is a sectional view taken on lines 4—4 of Fig. 2.

The device illustrated in the drawings includes a trough-like receptacle 10 which may be generally square at its upper open side and having end walls 11 and side walls 12, the side walls converging at the lower portion of the receptacle to form a rounded bottom of the trough. A flange 14 is formed or otherwise secured to the upper periphery of the receptacle 10 whereby the apparatus may be securely fastened to similar flanges integral with the bottom of the hopper 13 as by bolts 15.

Tubular members 16 integral with the receptacle 10 communicate therewith through suitable openings formed in the end walls 11, the openings and tubular members being diametrically disposed in the illustration. A discharge nozzle 17 is positioned within each tubular member 16 and slidably supported therein by a cradle member 18 and a partition member 19. The partition member 19, in addition to supporting the discharge nozzle, also acts to block off the outermost portion of the tubular member 16 exteriorly of the discharge nozzle from communication with the receptacle 10.

To insure an air tight seal at the partition, a rubber gasket 20 carried by and slidable on the discharge nozzle may be pressed firmly against the partition, after adjustment of the nozzle to be later explained.

It has been discovered that when the entrance end of the discharge nozzle is placed directly in the material, interruptions in conveying are occasioned due to overloading of the line. Such overloading results in power losses and reduction of the average conveying rate. To overcome this disadvantage, deflectors 21 are provided within the receptacle 10 and extend downwardly from adjacent the top of the discharge opening and have their outer side edges flush with the side walls 12. These deflectors direct the discharging material to the lower portion of the discharge nozzle and insure steady and uniform flow.

The characteristics of the many different materials which may be conveyed by the present apparatus vary over a wide range. Some are much heavier than others, or the angle of repose from the edge of the deflectors 21 may differ. Maximum discharge of a given material is desired and may be obtained by adjusting the discharge nozzle laterally so as to insert the nozzle a greater or less distance into the material. For this purpose, each discharge nozzle is provided with an adjusting means comprising screw members 22, supported in brackets 23, which threadedly engage lugs 24 securely fastened to the outer periphery of the discharge nozzle. It will be readily apparent from this construction that the nozzle may be withdrawn slightly to reduce the volume of material being entrained, or inserted further into the receptacle to entrain more material.

Conduits 25 secured to the top of each tubular member 16 communicate therewith through openings 26 in the tubular member for the purpose of directing the entraining air to the tubular member 16 at a point adjacent the discharge nozzle entrance. Slide valves 27 control the opening into the tubular member, and a rod 28, secured to the slide valve terminating in a handle 29 and guided in its movement by guide 29', permits easy operation of the valve by hand from the end of the tubular member. The upper portion of the partition 19 is provided with a slot to permit movement of the slide valve, the partition also supporting the valve. A catch 30 insures an airtight seal of the opening 26 when the valve is in its forward position.

Air conduits 25 communicate with each other at all times through openings 31 and passageways 32. That no extraneous matter will seek its way into the device when not in use and contaminate the material, closure members 33 and 34 hinged at 35 and 36 and having hand grips 37 and 38, are provided for the tubular members 16 and air conduit 25 respectively. With such an arrangement, the entraining air may be drawn into the receptacle from one conduit only, and by means of the slide valves 27 directed to the receptacle in the desired volume from diametrically opposite sides.

Closure members 39 having hand grips 40 are provided for the outer ends of the discharge nozzle and may be removed for insertion of the conveying line presently to be described. It will be clear that if it is desired to discharge material from one side only, the closure will be removed from this side only.

In use, the apparatus which, for example, may be attached to a hopper bottom car filled with material, arrives at the point where unloading is desired with all closures fastened tight. Although the material can be unloaded through both discharge nozzles at once, it is usually the practice to unload through one, the operation being the same in either event, and for the purpose of this description, unloading from one side only will be assumed.

If the material is such that it will be detrimental to permit any dust from the atmosphere to contact the material, closure 34 is removed from the air conduit 25 and the conduit connected to a source of filtered air. In the event that dust particles will not damage the material, the conduit is merely opened to the atmosphere.

Closures 33 and 39 are then removed at the desired side and a conveying conduit usually terminating in a flexible hose is connected to the discharge nozzle 17. Slide valves 27 are adjusted to permit the entraining air to enter the device in the desired manner, and the device is ready for the unloading operation.

The conveying conduit, having its one end connected to the discharge nozzle, has its outer end remote therefrom connected to a source of reduced pressure, thus the entraining air is caused to flow into the tubular member or members 16 and thence into the discharge nozzle, the air in its flow entraining material adjacent the inlet end of the nozzle. As this material is removed, additional material flows by gravity to take its place and thus a continuous conveying operation follows.

Should it be desired to increase the volume of material entrained, the discharge nozzle can be adjusted to extend further into the receptacle or, if the load is too heavy, the opposite adjustment can be made.

With the present apparatus, adjustment of the openings 26 on each side of the receptacle can be made so as to have a desired portion of the entraining air enter at the side of the receptacle opposite from the discharge nozzle through which the material is being conveyed. Such an arrangement has the advantage of aerating the material prior to its being entrained, which results in easier operation and maximum conveying. At times it may be desirable to have the total air enter at the side opposite the discharge nozzle being used, in which event the slide valve adjacent this nozzle will be closed and the opposite valve opened.

When the material has nearly all been discharged, the air inlets on each side have a further advantage in that with the inlet, adjacent the discharge nozzle being used, closed and all the air entering the opposite side, the receptacle to be swept clean of the last bit of material which is extremely important in unloading materials which, if left, would deteriorate and possibly damage new material placed in the receptacle.

It will be obvious that when unloading through both discharge nozzles, adjustments of the discharge nozzle and air inlets may be so set as to convey at a desired rate from each side.

From the foregoing, the embodiments of my invention will be fully understood, but it is to be understood that the invention is not restricted to the present disclosure to any extent otherwise than restricted by the manner in which such invention is claimed.

I claim:

1. In an apparatus for unloading hopper bottom receptacles, comprising an auxiliary receptacle having a discharge opening therein, a tube integral with the auxiliary receptacle and communicating therewith, said tube having an opening therein, a discharge nozzle supported within the tube and adapted to be connected at one end to a suction conveying line, a partition within the tube outwardly of the opening and through which the discharge nozzle passes, a conduit carried by the tube for directing entraining air to the opening, a valve for regulating the opening, means for admitting air into the lower portion of the auxiliary receptacle at a point spaced from said discharge opening so that when suction is applied to the conveying line air admitted through said air admission means will be caused to sweep across the lower portion of the auxiliary receptacle to said discharge nozzle, and means for controlling the amount of air admitted through said admission means.

2. In an apparatus for unloading hopper bottom receptacles, comprising an auxiliary receptacle, diametrically disposed tubes extending outwardly of the auxiliary receptacle and communicating therewith, said tubes each having an air inlet opening therein, a discharge nozzle supported within one of the tubes and adapted to be connected at one end to a conveying line, means for directing air to the air inlet openings, valves regulating the openings, and a passageway connecting the tubes whereby the entraining air may be caused to enter the receptacle at diametrically opposite sides in controlled volume.

3. In an apparatus for unloading hopper bottom receptacles, comprising an auxiliary receptacle having diametrically disposed discharge openings therein, deflectors controlling the direction of passage of material to the discharge openings, tubes extending outwardly of the auxiliary receptacle and communicating therewith through the discharge openings, said tubes having air inlet openings therein, a discharge nozzle supported within each of the tubes and adapted to be connected at one end to independent conveying lines whereby material can be conveyed from both sides simultaneously, a conduit open at one end and having a closure therefor carried by each tube for directing air to the inlet openings, valves regulating the air inlet openings, passageways connecting the conduits, whereby the volume of air entering the receptacle from either side may be controlled, and means for adjusting the discharge nozzles laterally.

4. In an apparatus for unloading hopper bottom receptacles, comprising an auxiliary receptacle having diametrically disposed discharge openings therein, deflectors controlling the direction of passage of material to the discharge openings, tubes extending outwardly of the auxiliary receptacle and communicating therewith through the discharge openings, said tubes each having an air inlet opening therein, a discharge nozzle supported within each of the tubes and adapted to be connected at one end to separate conveying lines, conduits carried by the tubes directing air to the inlet openings, valves regulating the air inlet openings, passageways connecting the conduits, and closures for the conduits whereby the entraining air entering one conduit may be directed to the receptacle at diametrically opposite sides in controlled volume.

5. In an apparatus for unloading hopper bottom receptacles, comprising an auxiliary receptacle having diametrically disposed discharge openings therein, tubes extending outwardly of the auxiliary receptacle and communicating therewith through the discharge openings, each tube having an air inlet opening therein, a discharge nozzle supported within each tube and adapted to be connected at one end to a conveying line, conduits carried by the tubes directing air to the inlet openings, valves regulating the air inlet openings, passageways connecting the conduits, and means for adjusting the discharge nozzles laterally.

6. In an apparatus for unloading hopper bottom receptacles, comprising an auxiliary receptacle having diametrically disposed discharge openings therein, deflectors controlling the direction of passage of material to the discharge openings, tubes extending outwardly of the auxiliary receptacle and communicating therewith through the discharge openings, said tubes having air inlet openings, a discharge nozzle supported in each tube adapted to be connected at one end to a conveying line, conduits carried by the tubes directing air to the air inlet openings, and valves regulating the air inlet openings.

7. In an apparatus for unloading hopper bottom receptacles, comprising an auxiliary receptacle having diametrically disposed discharge openings therein, tubes extending outwardly of the auxiliary receptacle and communicating therewith, said tubes having air inlet openings, a discharge nozzle supported within each tube adapted to be connected at one end to a conveying line, partitions within the tubes outwardly of the air inlet openings through which the discharge nozzle passes, conduits carried by the tubes for directing air to the air inlet openings, valves regulating the air inlet openings, and passageways connecting the conduits whereby the entraining air can be directed in controlled volume to opposite sides of the auxiliary receptacle.

8. In an apparatus for unloading hopper bottom receptacles, comprising an auxiliary receptacle having diametrically disposed discharge openings therein, tubes extending outwardly of the auxiliary receptacle and communicating therewith, said tubes having air inlet openings, a discharge nozzle supported within each tube adapted to be connected at one end to a conveying line, a removable closure for the end of the discharge nozzle remote from the auxiliary receptacle, a partition in each tube outwardly of the air inlet opening through which the discharge nozzle passes, conduits for directing material entraining air to the air inlet openings, a valve for regulating each air inlet opening, passageways connecting the conduits whereby upon regulation of the valves the entraining air is directed to the auxiliary receptacle in desired volume at each side, closure means for the outer ends of the tubes to insure against the entrance of extraneous matter when not in operation, and means for adjusting the discharge nozzles longitudinally of the tubes to vary the quantity of material entrained.

PHILIP R. HORNBROOK.

REFERENCES CITED

The following references are of record in the file of this patent:

UNITED STATES PATENTS

| Number | Name | Date |
| --- | --- | --- |
| 530,829 | Duckham | Dec. 11, 1894 |
| 1,943,780 | Allen | Jan. 16, 1934 |
| 2,190,726 | McKenna | Feb. 20, 1940 |

FOREIGN PATENTS

| Number | Country | Date |
| --- | --- | --- |
| 374,033 | Germany | Apr. 19, 1923 |
| 688,286 | Germany | Feb. 16, 1940 |